(12) United States Patent
Fontan Tarodo et al.

(10) Patent No.: US 6,777,919 B1
(45) Date of Patent: Aug. 17, 2004

(54) SWITCHED POWER SUPPLY CONVERTER FOR BROAD RANGE OF INPUT VOLTAGES

(75) Inventors: Antonio Fontan Tarodo, Pozuelo de Alarcon (ES); Jorge Gonzalez Gonzalez, Alcobendas (ES); Antonio J. Huertas Blazquez, Madrid (ES)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/089,797

(22) PCT Filed: Oct. 2, 2000

(86) PCT No.: PCT/EP00/10104
§ 371 (c)(1),
(2), (4) Date: Jun. 26, 2002

(87) PCT Pub. No.: WO01/26208
PCT Pub. Date: Apr. 12, 2001

(30) Foreign Application Priority Data

Oct. 5, 1999 (ES) ............................................... 9902189

(51) Int. Cl.[7] ............................ G05F 3/16; G05F 1/618
(52) U.S. Cl. ........................ 323/225; 323/266; 323/222
(58) Field of Search ................................ 323/225, 266, 323/282, 222, 226, 272, 273; 363/97, 131, 16, 17, 19, 20

(56) References Cited

U.S. PATENT DOCUMENTS

| 5,006,782 A | | 4/1991 | Pelly | |
|---|---|---|---|---|
| 5,282,122 A | * | 1/1994 | Summer | 363/25 |
| 5,414,342 A | | 5/1995 | Mammano et al. | |
| 5,422,562 A | * | 6/1995 | Mammano et al. | 323/282 |
| 5,483,436 A | * | 1/1996 | Brown et al. | 363/98 |
| 5,565,761 A | * | 10/1996 | Hwang | 323/222 |
| 5,570,276 A | | 10/1996 | Cuk et al. | |
| 5,815,380 A | * | 9/1998 | Cuk et al. | 363/16 |

* cited by examiner

*Primary Examiner*—Rajnikant B Patel
(74) *Attorney, Agent, or Firm*—Sughrue Mion, PLLC

(57) ABSTRACT

Switched power supply converter for broad range of input voltages that comprises a first stage (11) connected in cascade with a second stage (21), such that a first voltage supplied from a voltage source is converted into a second voltage by means of a first switching element (11-3). The second voltage is transformed into a third DC voltage by the operation of the second stage (21).

A control circuit (11-9) controls the duty cycle of the first switching element (11-3) so that the duty cycle varies between a first limit and a second limit of the duty cycle when the first voltage lies within a predetermined voltage range. The control circuit (11-9) sets the duty cycle to the first limit of the duty cycle or to the second limit of the duty cycle in the event of the first voltage being outside the predetermined range of voltage values.

9 Claims, 1 Drawing Sheet

SWITCHED POWER SUPPLY CONVERTER FOR BROAD RANGE OF INPUT VOLTAGES

OBJECT OF THE INVENTION

The present invention relates to a switched power supply converter that comprises at least one switching element with which the transfer of energy between the input and the output of the power supply converter is governed.

The switching element is controlled so that its duty cycle is at all times a function of the value of the output voltage, whereby the power supply converter offers a high efficiency over a universal range of input voltages.

The switched power supply converter is of special, but not exclusive application in telecommunications systems, which are fed from voltage sources of 38 to 380 V.

STATE OF THE ART

A switched power supply converter which has a switching element whose duty cycle is variable and which receives a broad range of input voltages has been described, for example, in the U.S. Pat. No. 5,856,739 granted to A. Trica, incorporated in the present patent application by reference.

The switched converter, implemented according to a buck topology, comprises a switching element that has a high switching frequency and a variable duty cycle, an internal control current loop, an external control voltage loop and a control circuit that controls the duty cycle of the switching element as a function of the current loop and of the voltage loop.

The power supply converter accepts a broad range of input voltages of up to four times the output voltage. The converter is capable of working in voltage ranges that include voltage values supplied from batteries and from alternating current supply sources. However it is incapable of working with higher ranges, for example 10:1, and providing power levels equal to or greater than 100 W.

In the U.S. Pat. No. 5,006,782 granted to Pelly, teaches a two or more buck converter circuits are cascaded in such a manner that the output of one serves as the input to the next, with the input voltage to each succeeding buck converter stage being reduced in magnitude.

The first stage of the buck converter containing a first switching transistor having an adjustable duty cycle to produce a nominally fixed output voltage. The output voltage of the first stage is lower than the minimum input voltage but is higher than the desired final output voltage of the cascaded buck converter. The output voltage of the first stage forms the input voltage of the second stage. The switching transistor in the second stage has a nominally fixed duty cycle sufficient to reduce its input voltage, which corresponds to the output voltage of the first stage, to some fixed output voltage for the second stage.

The first stage is designed to reduce input voltage of 450 volts to some constant value 80 volts. This is accomplished by continually adjusting the duty cycle of the switching transistor in the first stage.

Unfortunately, when the input voltage is outside of the range between 450 volts and 80 volts, first stage does not teaches how is adjusting the duty cycle of the switching transistor in the first stage.

It has become necessary to develop a switched power supply converter that accepts a universal range of input voltages, which includes the voltage values supplied normally by the batteries of telecommunications systems, and guarantees for all of them the provision of a constant and regulated voltage at its output, so that the converter offers a high efficiency over the entire range of input voltages.

CHARACTERISATION OF THE INVENTION

To overcome the problems outlined above a switched power supply converter for a broad range of input voltages is proposed which is of ideal dimensions and electrical operating characteristics for supplying telecommunications systems with electrical power equal to o greater than 100 W.

An object of the switched power supply converter of the invention is to provide a converter that works with a very broad voltage range, for example 38 to 380 V (10:1), with simple overall operation and high overall performance. The power supply converter is implemented by means of two conversion stages connected in cascade. Both stages are implemented by means of straightforward, highly efficient conversion topologies.

A further object is that both conversion stages have a control circuit for regulating respectively their output voltage, the regulation processes being independent of each other.

The control circuit for the first stage regulates the duty cycle of a switching element of the first stage in the event that the input voltage lies within a predetermined range of input voltages, and when the input voltage is outside said range, the duty cycle is set to a value so that the output voltage of the first stage is proportional to the input voltage. As a consequence, the range of input voltages of the second stage is less than the range of input voltages of the first stage. Then, it is possible to optimise the operation of the components of the second stage, in particular for boosting its efficiency.

The switched power supply converter for broad range of input voltages of the invention is divided into a first stage that converts a first voltage supplied from a voltage source into a second voltage by means of a first switching element; a second stage receives the second voltage and transforms it into a third DC voltage.

A control circuit controls the duty cycle of the first switching element so that the duty cycle varies between a first limit of the duty cycle and a second limit of the duty cycle when the first voltage is within a predetermined range of voltage values. The control circuit sets the duty cycle to the first limit of the duty cycle or to the second limit of the duty cycle in the event that the first voltage lies outside the predetermined range of voltage values. over the entire range of input voltages.

CHARACTERISATION OF THE INVENTION

To overcome the problems outlined above a switched power supply converter for a broad range of input voltages is proposed which is of ideal dimensions and electrical operating characteristics for supplying telecommunications systems with electrical power equal to or greater than 100 W.

An object of the switched power supply converter of the invention is to provide a converter that works with a very broad voltage range, for example 38 to 380 V (10:1), with simple overall operation and high overall performance. The power supply converter is implemented by means of two conversion stages connected in cascade. Both stages are implemented by means of straightforward, highly efficient conversion topologies.

A further object is that both conversion stages have a control circuit for regulating respectively their output voltage, the regulation processes being independent of each other.

The control circuit for the first stage regulates the duty cycle of a switching element of the first stage in the event that the input voltage lies within a predetermined range of input voltages, and when the input voltage is outside said range, the duty cycle is set to a value so that the output voltage of the first stage is proportional to the input voltage. As a consequence, the range of input voltages of the second stage is less than the range of input voltages of the first stage. Then, it is possible to optimise the operation of the components of the second stage, in particular for boosting its efficiency.

The switched power supply converter for broad range of input voltages of the invention is divided into a first stage that converts a first voltage supplied from a voltage source into a second voltage by means of a first switching element; a second stage receives the second voltage and transforms it into a third DC voltage.

A control circuit controls the duty cycle of the first switching element so that the duty cycle varies between a first limit of the duty cycle and a second limit of the duty cycle when the first voltage is within a predetermined range of voltage values. The control circuit sets the duty cycle to the first limit of the duty cycle or to the second limit of the duty cycle in the event that the first voltage lies outside the predetermined range of voltage values.

BRIEF DESCRIPTION OF THE FIGURES

A more detailed explanation of the invention is given in the following description, based on the attached figures, in which.

DESCRIPTION OF THE INVENTION

Figure 1:
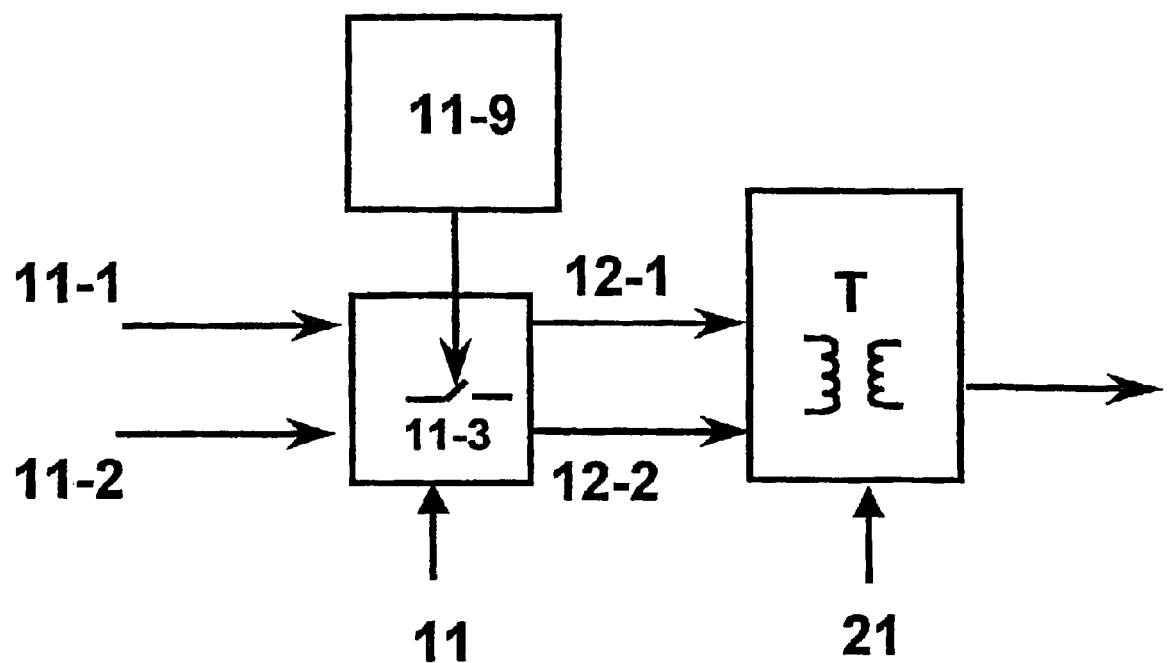
FIG. 1 shows a block diagram of a preferred embodiment of a switched power supply converter according to the invention.

FIG. 1 shows a block diagram of a preferred embodiment of a switched power supply converter for broad range of input voltages. The power supply converter has a first stage 11 and a second stage 21 connected in cascade.

The first stage 11 of the power supply converter is connected to a power supply source via some input terminals 11-1 and 11-2, which correspond to the input terminals of the power supply converter. For example, the terminal 11-1 is connected to the positive pole and the terminal 11-2 to ground, respectively.

The first stage 11 is adapted to convert a broad range of input voltage values, first input voltage, into a predetermined range of output voltage, second output voltage, across some output terminals 12-1 and 12-2, which correspond to some input terminals of the second stage 21. Thus, this second voltage is directly fed to the input of the second stage 21.

The values that are possible for the second output voltage of the first stage 11 to adopt are such that they permit the stress level to be low in some switching elements included in the second stage 21, and also prevents them from having to support a high current spike.

It is possible to select different conversion topologies both for the first stage 11 and for the second stage 21, all of said topologies being known in the state of the art In a first embodiment for the first stage 11 a conversion topology without galvanic isolation is chosen, which is highly efficient and of straightforward operation; and for the second stage 21 a conversion topology is chosen that has a transformer T. In this manner, the second stage 21 provides galvanic isolation between the input and output of the switched power supply converter, permits the power supply converter to be designed with various outputs, as well as compliance with safety standards.

The first stage 11 comprises at least a first switching element 11-3, such as a field-effect transistor MOSFET, in order to perform the chopping of the first voltage applied across the input terminals 11-1 and 11-2; and produces across its output terminals 12-1 and 12-2 the second voltage, through the control of the duty cycle of the first switching element 11-3.

The regulation process of the second voltage is achieved by varying the duty cycle of the first switching element 11-3 by means of a control circuit 11-9, for example a pulse width modulation device, which includes a control logic to carry out missions such as regulation of the second voltage, limitation of the duty cycle of the first switching element 11-3, and others.

It is possible for the duty cycle to be limited to a maximum duty cycle (first limit of the duty cycle) or to a minimum duty cycle (second limit of the duty cycle).

The first stage 11 regulates the second voltage by means of the control circuit 11-9 in the event that the value of the first input voltage applied across its terminals 11-1 and 11-2 is within a predetermined voltage range, i.e., the control circuit 11-9 produces a duty cycle which is within a predetermined range of the duty cycle, which is defined by means of the first limit and the second limit of the duty cycle, so that the second voltage applied across the output terminals 12-1 and 12-2 is stabilised.

However, when the value of the input voltage applied across the terminals 11-1 and 11-2 is above or below the predetermined voltage range, the control circuit 11-9 generates a constant duty cycle, the value of which coincides with one of the limits of the predetermined range of the duty cycle, i.e., the first stage 11 does not regulate its output voltage, merely generates the voltage corresponding to one of the limits of the duty cycle (maximum duty cycle or minimum duty cycle). The control circuit 11-9 sets the limit of the duty cycle by means of its control logic.

In brief, the first stage 11 regulates the second output voltage for a range of the first input voltage and for values of input voltage outside this voltage range the first stage 11 produces across its output terminals 12-1 and 12-2 a second voltage proportional to the first input voltage.

In both situations, the second voltage present across the terminals 12-1 and 12-2 is such that it permits the stress level to be low in the switching elements of the second stage 21, and also prevents them from having to support a high current spike.

The embodiment of the first stage 11 is possible by means of different conversion topologies without galvanic isolation such as a buck converter or a boost converter. The converters without galvanic isolation are implemented with a minimum of components implying that it is a converter free of operational complexity. In both topologies the transfer of energy is performed inductively since it can be considered that the connection between the input and the output is achieved via an inductor through the first switching element 11-3.

The second stage 21 is adapted to transform the second voltage into a third voltage by the action of a transformer T. Then, it is possible to implement said stage 21 according to different conversion topologies with galvanic isolation such as a forward converter with active clamp or a flyback converter. Both converters have the property of including galvanic isolation, however the latter is mounted in a different position. The galvanic isolation is provided by means of the transformer T.

Therefore, the second stage 21 provides galvanic isolation between the input and the output of the switched power supply converter; additionally, with a simple change of turns ratio a change between a step-down and a step-up output is facilitated and it is also possible to provide various outputs for the switched power supply converter.

It is also possible to achieve a change of polarity in the output voltage by merely changing the wiring of transformer T. Before the transformed voltage reaches the load, it has to be filtered to produce the third stabilised voltage, which shall correspond to the output of the converter. The second stage 21 performs the regulation of the third voltage by means of a second control circuit that extracts a sample of the third voltage.

The topologies mentioned above are known in the state of the art, consequently their operation is not explained herein. The first stage 11 and the second stage 21 of the switched power supply converter can be implemented according to other conversion topologies.

The switched power supply converter of the invention has a high overall efficiency and its operation is straightforward, in spite of having two conversion stages 11 and 21, with their corresponding control loops, which are independent.

By means of a rectifier bridge, the input terminals 11-1 and 11-2 of the switched power supply converter are connected to an ac voltage source.

What is claimed is:

1. Switched power supply converter for broad range of input voltages that comprises a first stage which converts a first voltage supplied from a voltage source into a second voltage by means of a first switching element and a second stage that receives the second voltage and transforms it into a third DC voltage, a first control circuit controls the duty cycle of the first switching element so that the duty cycle varies between a first limit of the duty cycle and a second limit of the duty cycle; wherein the first control circuit is adapted to fix the duty cycle at the first limit of the duty cycle or at the second limit of the duty cycle in the event that the first voltage is outside a predetermined range of input voltage values.

2. Switched power supply converter according to claim 1, wherein the first control circuit is adapted to receive a sample of the second voltage.

3. Switched power supply converter according to claim 1, wherein the first stage is implemented according to a conversion topology without galvanic isolation.

4. Switched power supply converter according to claim 1, wherein the second stage is implemented according to a conversion topology with galvanic isolation.

5. Switched power supply converter according to claim 1, wherein the second stage comprises a transformer with a predetermined number of secondary windings that configure a predetermined number of outputs of the switched power supply converter, respectively.

6. Switched power supply converter according to claim 1, wherein the second stage comprises a second control circuit that is adapted to receive a sample of the third voltage and regulates the third voltage.

7. Switched power supply converter according to claim 1, wherein the first control circuit and the second control circuit are independent.

8. Switched power supply converter according to claim 1, wherein when the first control circuit controls the duty cycle of the first switching element so that the duty cycle varies between a first limit of the duty cycle and a second limit of the duty cycle and the input voltage level falls outside an input voltage range defined by a first and second predetermined level, the duty cycle of the first switching element remains constant.

9. Switched power supply converter according to claim 1, wherein the duty cycle of the first power stage is independent of the supplied voltage.

* * * * *